Sept. 26, 1972   J. A. R. CAILLAS   3,694,303
PACKING BLOCK
Filed Feb. 2, 1971

United States Patent Office 3,694,303
Patented Sept. 26, 1972

3,694,303
PACKING BLOCK
Jean Alin Robert Caillas, 29 Rue d'Estienne d'Orves, Viroflay, France
Filed Feb. 2, 1971, Ser. No. 111,888
Claims priority, application France, Feb. 2, 1970, 7003554
Int. Cl. B32b 7/06; B65d 85/30
U.S. Cl. 161—164                             6 Claims

ABSTRACT OF THE DISCLOSURE

The invention relates to a packing block comprising removable layers of foil for regulating the thickness of the block, the foils on one face being of a different thickness from those of the other, and the thickness of the foils on one face being a multiple of the thickness of the foils on the other, the invention being intended for making packing blocks for arresting play or balancing, particularly in the field of precision equipment.

---

The invention relates to a packing block comprising layers of foil which can be removed to regulate the thickness of the packing block.

More particularly it relates to a packing block comprising foils in which the thickness of the foils on one face is different from that of the foils on the other face, the thickness of the foils on one face being a multiple of the thickness of the foils on the other face.

Another feature of the invention is that the foils of different thickness are separated by a homogeneous central part.

Another feature of the invention is that the foils of different thickness are provided with a means of identification enabling their thickness to be identified.

The invention is illustrated but not limited by the examples in the attached drawings in which.

It is therefore the object of the invention to provide a packing block that is simple and economic to make and enable the thickness of the packing block to be adjusted to the required amount without any possibility of error.

According to the invention, the packing block consists of foils 1 and 2 of different thicknesses accessible from both faces of the packing block.

Thus, one or several foils 1 of unit thickness $a$ corresponding to the adjustment required (0.01 mm. 0.02– 0.05 mm. etc. . . . ) is or are on one of the faces of the packing block. These foils can be made of a metal such as mild steel, brass, aluminium, stainless steel, etc. and are assembled by means of an adhesive, soldering, or any other means in a manner such that the uppermost foil of the packing block can easily be removed manually with the help of a simple tool such as an ordinary knife or a paring knife.

One or several foils 2 of unit thickness $b$ equal to twice or to another multiple of the unit thickness $a$ of the foils 1 is or are on the other face of the packing block. The foils 2 are joined to one another and to the foils 1 in the same manner as before, but the total number of the foils 1 and 2 must be such that the overall thickness of these foils must be greater than or equal to the required total amount of adjustment required. This total amount is equal to the difference between the upper and lower limits of the total adjustment to be made.

Figure 1:
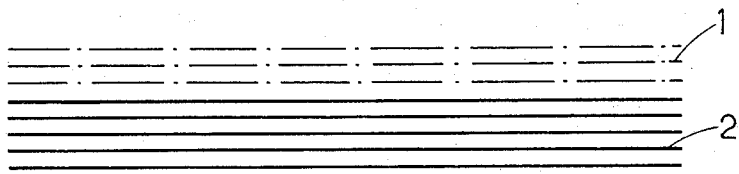
FIG. 1 represents a packing block consisting solely of foils that can be removed.
Figure 2:
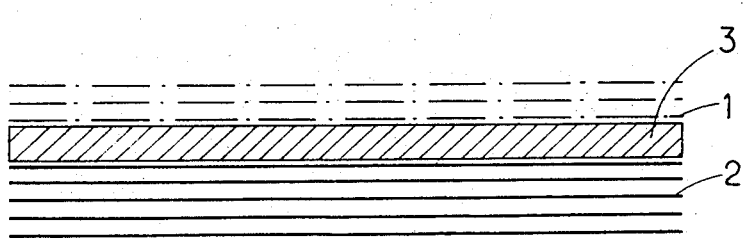
FIG. 2 represents a packing block comprising a homogeneous central part.

However, if the total required thickness of the packing block is appreciably greater than the adjustment required it is possible to make a packing block (see FIG. 2) which includes a part 3, between foils 1 and 2, which cannot be stripped off and which consists of a solid and homogeneous material. This homogeneous central part can be made to become an integral part of the assembly comprising foils 1 and 2 by means of adhesive, soldering or any other means of assembly.

According to the invention the foils of thickness 1 and the foils of thickness 2 constituting the two faces of the packing block are provided with a means of identification to enable them to be readily located and identified.

The means of identification may be a mark on the foils but, it is preferred that foils of different thicknesses should be of different colour. By giving the different foils a colour which corresponds to various thickness according to a colour code agreed in advance it is possible to identify the foils immediately, simply by visual inspection.

The user can then select the foil or foils which he must remove to obtain the desired thickness.

The different colours may be those of the natural colour of different materials such as mild steel and brass, mild steel and aluminium, mild steel and stainless steel, etc.

The different colours may also be obtained by using a combination of foils made of the same material but the surface of which has previously been treated in a different manner for each of the thicknesses of the foils 1 and 2. Foils of one particular thickness can thus be made of ordinary mild steel and the other foils of galvanised mild steel. Alternatively, the foils of one particular thickness can be made of bonderized mild steel and the others of copper coated mild steel.

To adjust the packing block to any amount $a$, it is not necessary that the packing block consist entirely of foils of thickness $a$.

Theoretically, a single foil of thickness $a$ is sufficient for this purpose if the rest of the block consists of foils of thickness $b-2a$.

Alternatively, it is sufficient to have two foils of thickness $a$ if the rest of the stock consists of foils of thickness $b=3a$. Alternatively, it is sufficient to have three foils $a$, if $b=4a$, etc.

In practice, one or several foils of thickness $a$ can be added together when it is desired to make several consecutive adjustments for example, during a maintenance operation.

If therefore it is desired to make an adjustment of 1 mm. in steps of 0.05 mm. using a packing block with an overall thickness of 2 mm., the block can include—

On one side: 2 foils of thickness $a=0.05$ mm. (one foil for the initial adjustment and a second foil for a possible subsequent maintenance adjustment)

On the other side: 9 foils of thickness $a=0.1$ mm. and of a colour different from that of the foils on the other side of the block.

For the central part: a homogeneous solid part of thickness $c=1$ mm.

A second combination might be:

One side: 5 foils of thickness $a=0.05$ mm.
On the other side: 5 foils of thickness $b=0.15$ mm.
For the central part: a homogeneous part with $c=1$ mm.

The initial adjustment and a possible subsequent maintenance adjustment can be made in the same way as in the preceding case.

The required thickness is obtained most rapidly by removing the necessary foil or foils. For example, to obtain a thickness of 1.55 mm. starting from 2 mm., using the first combination, it is sufficient to remove one foil 0.05 thick and four foils each 0.1 mm. thick. In the second combination, it is necessary to remove 3 foils each 0.15 mm. thick.

To obtain a thickness of 1.45 mm., one foil 0.05 mm. thick and five foils each 0.1 mm. thick must be removed, or else 2 foils each 0.05 mm. thick and three foils each 0.15 mm. thick, etc.

A combination of the foils 1 and 2 and if necessary also of the central part 3 is chosen in manner such as to ensure that the cost of manufacturing and using the block is as economical as possible, taking into account the cost price respectively of the foils 1 and 2 and, if necessary, also that of the solid part 3.

In general the part consisting of the foils 1 should be minimized by comparison with the part consisting of foils 2, because, given equal overall thickness, the cost of making a block is inversely proportional to the unit thickness of the foils constituting the block.

In this way it is possible to produce and use most economically a block consisting of removable layers of foil to make adjustments by a given amount at a time.

It will be evident that the invention is not limited to the embodiments described and illustrated hereinabove and that other variants are possible within the scope of the invention.

What is claimed is:

1. A packing block for packaging delicate precision equipment which comprises:
    (a) a plurality of removable layers of metal foil for regulating the thickness of the block,
    (b) said layers of metal foil describing the two major faces of the block,
    (c) the foils on one face of the block being of uniform thickness,
    (d) the foils on the second face of the block being of a controlled thickness of an integral multiple of the thickness of the foils on the first face, and,
    (e) means for joining said foils to one another such that the uppermost face of the packing block can be removed manually.

2. Packing block according to claim 1 in which the foils of different thicknesses are separated by a homogeneous central part.

3. Packing black according to claim 1 in which the foils are provided wtih a means of identification enabling their thickness to be identified.

4. Packing block according to claim 1 in which the means of identification consist of foils of different thicknesses being of different colour.

5. Packing block according to claim 1 in which the different colours of foils of different thicknesses are the colours of the material of which the foils are made.

6. Packing block according to claim 1 in which the different colours of the foils of different thicknesses are obtained by a different treatment of the surfaces of the material of the foils.

References Cited

UNITED STATES PATENTS

| | | | |
|---|---|---|---|
| 245,227 | 8/1881 | Schmidt et al. | 52—98 |
| 3,075,446 | 1/1963 | Horne | 161—406 |
| 1,942,287 | 1/1934 | Heitz | 161—406 UX |
| 3,501,797 | 3/1970 | Nappi | 161—406 |
| 2,641,805 | 6/1953 | Spector et al. | 52—98 |
| 3,233,383 | 2/1966 | Salm | 52—98 |
| 2,728,479 | 12/1955 | Wheeler | 52—98 |
| 3,466,218 | 9/1969 | Avery | 161—406 |
| 2,819,032 | 1/1958 | Detrie et al. | 161—406 |
| 3,257,228 | 6/1966 | Reed | 161—406 |
| 2,727,382 | 12/1955 | Kurz | 52—98 |
| 3,511,464 | 5/1970 | Doll | 229—14 C |
| 3,195,686 | 7/1965 | Johnson | 206—46 FR |
| 3,500,996 | 3/1970 | Gorman | 206—46 FR |
| 3,063,885 | 11/1962 | Kieffer | 206—46 FR |
| 3,063,613 | 11/1962 | McClive | 206—46 FR |
| 3,288,353 | 11/1966 | McCullough | 206—46 FR |
| 2,867,367 | 1/1959 | Butz | 206—46 FR |

ROBERT F. BURNETT, Primary Examiner

G. W. MOXON II, Assistant Examiner

U.S. Cl. X.R.

161—165. 406; 206—46 FR; 217—53 R; 229—14 C